(12) United States Patent
Thom, Jr.

(10) Patent No.: US 9,726,273 B2
(45) Date of Patent: Aug. 8, 2017

(54) CONNECTING DEVICE OF PELLET CHAMBER AND GEARBOX

(71) Applicant: JIANGSU MUYANG HOLDINGS CO., LTD., Yangzhou, Jiangsu Province (CN)

(72) Inventor: Kelsey Curtis Thom, Jr., Yangzhou (CN)

(73) Assignee: JIANGSU MUYANG HOLDINGS CO., LTD., Yangzhou, Jiangsu Province (CN)

( * ) Notice: Subject to any disclaimer, the term of this patent is extended or adjusted under 35 U.S.C. 154(b) by 0 days.

(21) Appl. No.: 15/049,514

(22) Filed: Feb. 22, 2016

(65) Prior Publication Data

US 2016/0169366 A1 Jun. 16, 2016

Related U.S. Application Data

(63) Continuation of application No. PCT/CN2014/081784, filed on Jul. 8, 2014.

(30) Foreign Application Priority Data

Jul. 2, 2014 (CN) .......................... 2014 1 0311315

(51) Int. Cl.
*F16H 57/02* (2012.01)
*F16H 57/04* (2010.01)
(Continued)

(52) U.S. Cl.
CPC .................................. *F16H 57/025* (2013.01)

(58) Field of Classification Search
CPC ..................................... F16J 15/18; B29B 7/40
(Continued)

(56) References Cited

U.S. PATENT DOCUMENTS 3,645,659 A * 2/1972 Schott, Jr. ........... B29B 17/0005
425/204
3,672,641 A * 6/1972 Slaby ...................... B29C 47/60
100/117
(Continued)

FOREIGN PATENT DOCUMENTS

CN 2287806 Y 8/1998
CN 2296629 Y 11/1998
(Continued)

OTHER PUBLICATIONS

State Intellectual Property Office of the P.R. China (ISR/CN), "International Search Report for PCT/CN2014/081784" China, March 30, 2015.
(Continued)

*Primary Examiner* — Terrell McKinnon
*Assistant Examiner* — Michael McDuffie
(74) *Attorney, Agent, or Firm* — Locke Lord LLP; Tim Tingkang Xia, Esq.

(57) ABSTRACT

A connecting device for connecting a pellet chamber to a gearbox, includes an adapting disc and an annular adapter. The adapting disc has a front side fixedly connected with the pellet chamber, a rear side fixedly connected with a front side wall of the gearbox, and a through hole disposed at a middle part. The power of the gearbox is outputted from the through hole of the adapting disc. The annular adapter is laminated around the through hole of the adapting disc from the front side of the adapting disc, and fixedly connected with the front side wall of the gearbox. The adapting disc uniformly distributes the gravity of the pellet chamber and the impact force from the pellet chamber to the front side wall of the gearbox, thereby avoiding the gearbox from being broken due to impact.

9 Claims, 3 Drawing Sheets

(51) Int. Cl.
*F16H 61/00* (2006.01)
*F16H 57/025* (2012.01)

(58) Field of Classification Search
USPC ................. 427/256; 118/302; 74/606 R
See application file for complete search history.

(56) References Cited

U.S. PATENT DOCUMENTS

| | | | | |
|---|---|---|---|---|
| 4,333,358 | A * | 6/1982 | Grattapaglia | F16H 3/091 74/359 |
| 5,134,901 | A * | 8/1992 | Grady | B01F 3/04446 261/DIG. 26 |
| 5,773,042 | A * | 6/1998 | Amano | B29C 45/54 425/207 |
| 6,524,516 | B1 * | 2/2003 | Rydberg | B29C 47/0004 264/209.6 |
| 2006/0182887 | A1 * | 8/2006 | Miller | B05C 5/001 427/256 |
| 2008/0290548 | A1 | 11/2008 | Landers | |
| 2013/0309344 | A1 * | 11/2013 | Posselt | B30B 11/28 425/237 |
| 2014/0138869 | A1 * | 5/2014 | Blok | B30B 11/208 264/109 |
| 2014/0348284 | A1 * | 11/2014 | Diamond | G21G 1/06 376/186 |
| 2015/0051528 | A1 * | 2/2015 | Gilbert | A61F 5/01 602/16 |
| 2015/0152966 | A1 * | 6/2015 | Sardinskas | F16J 15/182 366/98 |
| 2016/0003343 | A1 * | 1/2016 | Mishra | F16H 57/029 74/606 R |
| 2016/0025411 | A1 * | 1/2016 | Plavnik | F26B 7/00 34/279 |
| 2016/0353766 | A1 * | 12/2016 | Jacobsen | A23G 9/045 |

FOREIGN PATENT DOCUMENTS

| | | |
|---|---|---|
| CN | 2894298 Y | 5/2009 |
| CN | 201541680 U | 8/2010 |
| CN | 201543461 U | 8/2010 |
| CN | 202823297 U | 3/2013 |
| CN | 203952381 U | 11/2014 |

OTHER PUBLICATIONS

State Intellectual Property Office of the P.R. China, "First Chinese Office Action for CN Application No. 201410311315.8", China, August 11, 2015.
State Intellectual Property Office of the P.R. China, "First Chinese Office Action for CN Application No. 201410311315.8", China, Nov. 30, 2015.

* cited by examiner

CONNECTING DEVICE OF PELLET CHAMBER AND GEARBOX

CROSS-REFERENCE TO RELATED APPLICATIONS

This application claims is a continuation application of PCT Application Serial No. PCT/CN2014/081784, filed Jul. 8, 2014, which itself claims priority to and benefit of Chinese Patent Application No. 201410311315.8, filed Jul. 2, 2014 in the State Intellectual Property Office of P.R. China, the entire contents of which are hereby incorporated by reference.

FIELD OF THE INVENTION

The present invention belongs to the technical field of food and feed processing equipment, relates generally to a granulator, and more particularly, to a connecting device for connecting a pellet chamber to a gearbox.

BACKGROUND OF THE INVENTION

The background description provided herein is for the purpose of generally presenting the context of the present invention and is neither expressly nor impliedly admitted as prior art against the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

The gearbox of a granulator is generally casted and molded by ASTM A45 30B class gray cast iron. The casting of the gearbox has four side walls, a top ceiling, and a bottom floor. Outer mounting feet are located at the bottom floor of the gearbox. The front side and the rear side of the gearbox are installed with cast hubs for supporting bearings for a gear shaft. Each of the left side and the right side of the gearbox is opened with an open portion, providing operation convenience for removal and inspection of the gear shaft. The side walls, the top ceiling, the bottom floor, and the cast hubs of the gearbox are all formed with ribs to enhance the rigidity and the strength of the gearbox. The gray cast iron material has excellent vibration dampening properties, and good strength for supporting the bearing and the gear shaft. Further, the manufacturing cost of the gray cast iron gearbox is low.

The hinge type pellet chamber in the related art is directly installed on the front end of the gearbox (ring die area). Installation plates are disposed in the corners of the front side wall of the gearbox. The installation plates have multiple connectors for connecting the hinge and the clamp. The hinge and the clamp are used for fixing the pellet chamber. The pellet chamber may be very heavy, thus cause a high stress on the installation plates of the casting. Under normal granulating condition, the gearbox can bear the concentrated stress; when over loaded, the pellet chamber may slide down. The most often incurred overload condition is that when a granulating mould is broken off, the loose parts after breaking off fall down and bump to the pellet chamber from the inside. Thus the pellet chamber applies a larger pressure on the installation plates, and subsequently the installation plates applies a larger pressure to one local area or a local point of the gearbox, which easily resulting in break-off of the gearbox at the connecting portion of the installation plate, or the installation plates break due to the high stress.

Therefore, a heretofore unaddressed need exists in the art to address the aforementioned deficiencies and inadequacies.

SUMMARY OF THE INVENTION

In one aspect, the present invention relates to a connecting device for connecting a pellet chamber to a gearbox, by which the gravity of the pellet chamber can be uniformly transmitted to the front side wall of the gearbox, so that the gearbox bears stress evenly, and the overloaded gearbox is prevented from broken due to impact.

In one embodiment, a connecting device for connecting a pellet chamber to a gearbox includes an adapting disc and an annular adapter. The adapting disc is connected with the front side wall of the gearbox. The middle part of the adapting disc is provided with a through hole for outputting the power of the gearbox. The annular adapter is laminated around the through hole and is fixedly connected with the front side wall of the gearbox. The front side of the adapting disc is fixedly connected with the pellet chamber, and the rear side of the adapting disc is fixedly connected with the gearbox. The adapting disc is laminated on the front side wall of the gearbox by the annular adapter, and the adapting disc uniformly distributes the gravity of the pellet chamber to the front side wall of the gearbox. The front side wall of the gearbox bears a substantially uniformly dispersed stress, and the stress distribution of the gearbox is good. The impact force subject to the pellet chamber can be uniformly dispersed, thereby avoiding the gearbox from being broken due to impact.

In one embodiment, the adapting disc is in a shape of a disc, and includes an annular rear side surface, and the rear side surface is adhered to the front side wall of the gearbox. The annular rear side surface is adhered to the front side wall of the gearbox with a large adhering interface, so that the gravity of the pellet chamber subject to the adapting disc and the pressure to the gearbox by the adapting disc can be uniformly distributed on the front side wall of the gearbox, thereby avoiding the gearbox from being damaged and broken due to concentrated stress.

In one embodiment, the left side and the right side of the adapting disc are symmetrically equipped with installing table facets for installing hinges and/or clamps of the pellet chamber. The installing table facets symmetrically arranged on the left and right side of the adapting disc can be installed with the pellet chamber from the left side or the right side through the hinge, depending on the actual demand, so as to have convenient on-site installation and adjustment of the equipment.

In one embodiment, the middle portion of the adapter is provided with a boss for being plugged in the through hole of the adapting disc and engaging with the through hole. At the same time, the boss also engages with the inner wall of the power output hole of the gearbox. The boss is plugged in the through hole of the adapting disc and the power output hole of the gearbox, which can efficiently disperse the concentrated stress around the power output hole of the gearbox.

In one embodiment, bolt through holes are uniformly distributed around the through hole of the adapting disc, and the adapting disc is laminated by the adapter onto the front side wall of the gearbox through bolts.

In one embodiment, one of the two installing table facets of the adapting disc is connected with the pellet chamber through the hinge, while the other installing table facet is connected with the pellet chamber through the clamp.

In one embodiment, the adapting disc is a spheroidal-graphite cast iron adapting disc or a steel adapting disc. The spheroidal-graphite cast iron adapting disc or the steel adapting disc has higher strength than the gray cast iron adapting disc. The gearbox can also be made of gray cast iron, as the gray cast iron has excellent vibration dampening properties and good supporting performance for the bearing and the gear shaft. At the same time, the gray cast iron is also a cost effective option.

Compared with the related art, certain embodiments of the present invention have the following advantages.

The pellet chamber is connected with the adapting disc. The adapting disc is laminated on the front side wall of the gearbox through an adapter. The adapting disc uniformly distributes the gravity of the pellet chamber on the front side wall of the gearbox, and the gearbox is subject to a uniformly dispersed pressure of the adapting disc, so that the gearbox is prevented from being subject to the pressure at a local part. When overloaded, the impact force which the pellet chamber suffers can also be uniformly dispersed to the front side wall of the gearbox, so that the gearbox is prevented from being broken due to impact. In certain embodiments of the present invention, the stress distribution of the gearbox is more reasonable, and the expensive gearbox is protected from damage.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
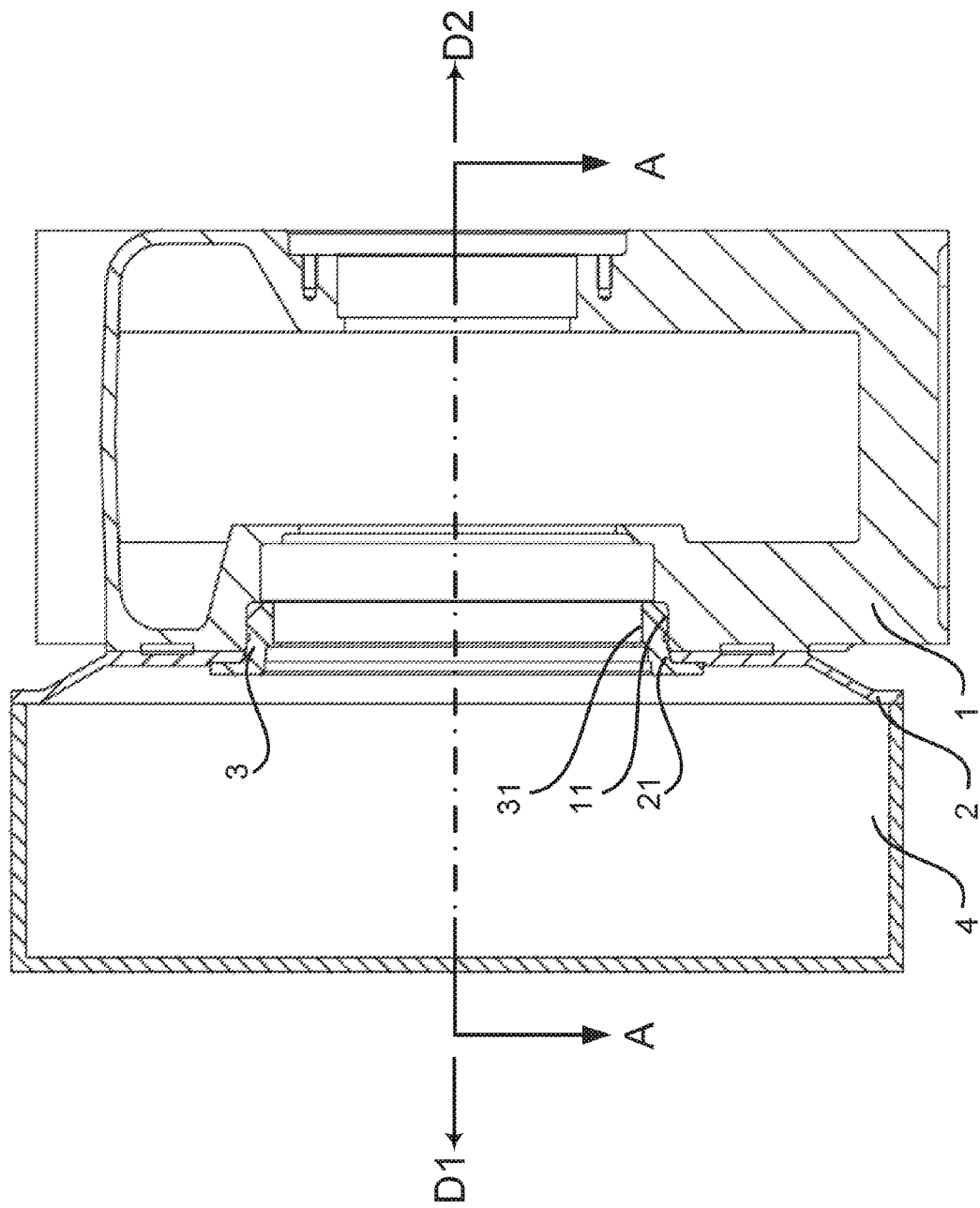
FIG. 1 is a schematic structural diagram of a connecting device for connecting a pellet chamber to a gearbox, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-3. In accordance with the purposes of this invention, as embodied and broadly described herein, this invention, in one aspect, relates to a connecting device for connecting a pellet chamber to a gearbox.

Figure 2:
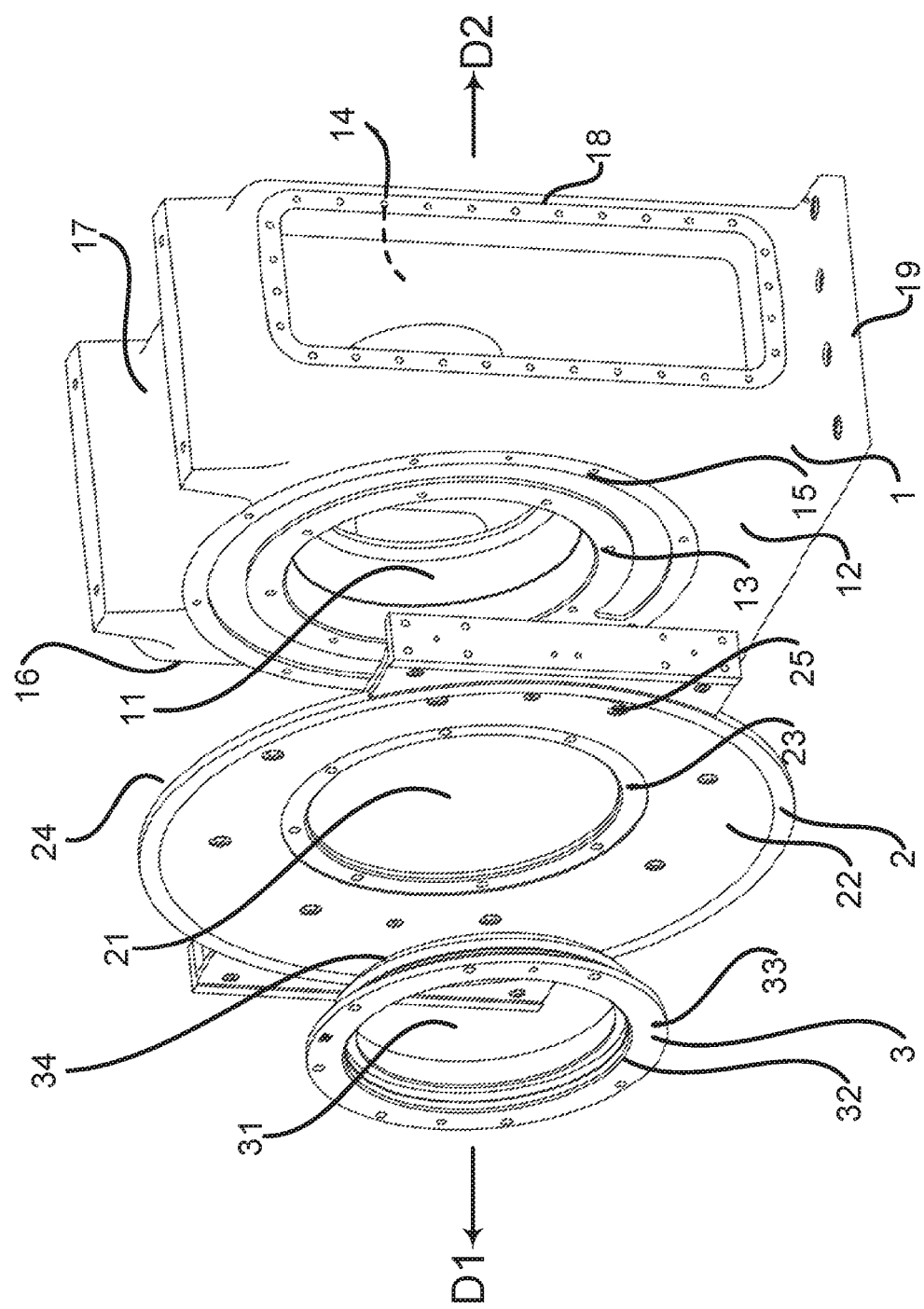
FIG. 2 is an explosive view of a connecting device for connecting a pellet chamber to a gearbox, according to one embodiment of the present invention.
Figure 3:
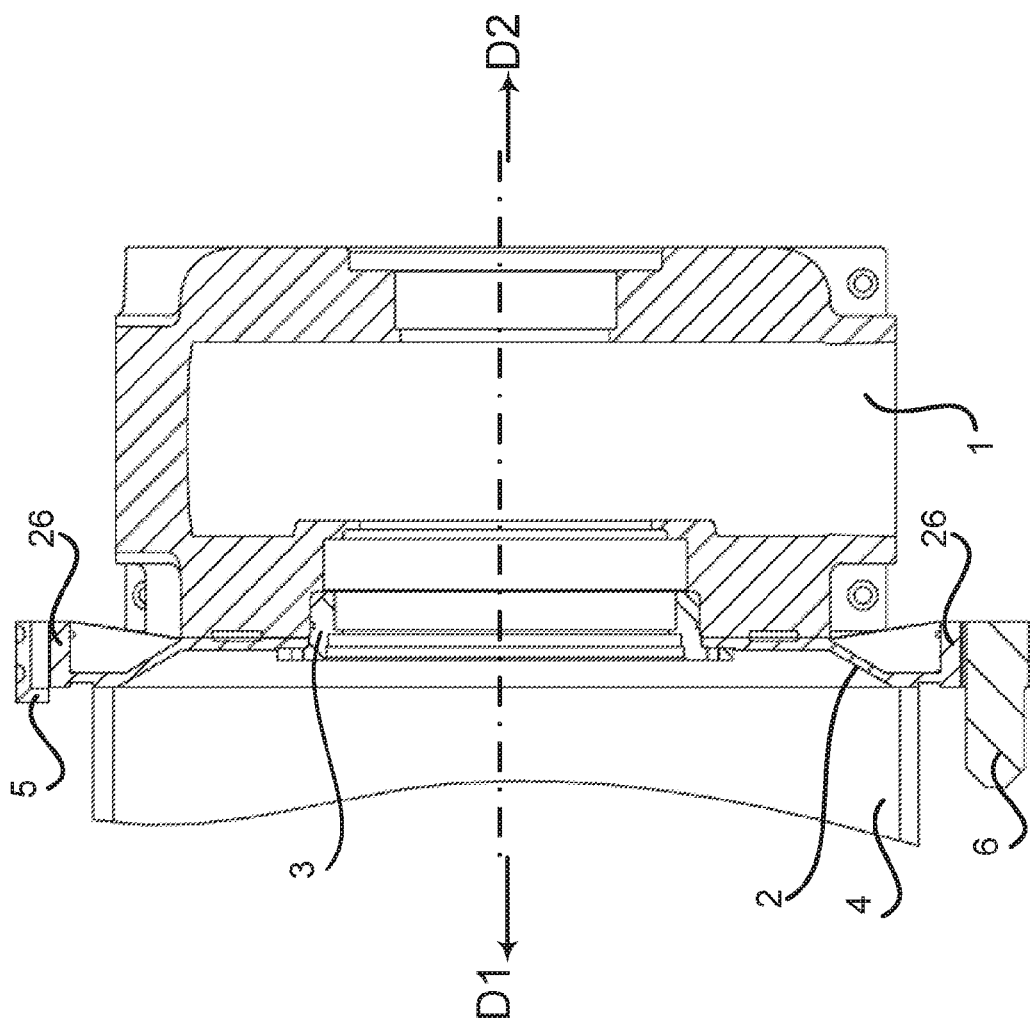
FIG. 3 is a sectional view along A-A direction in FIG. 1.

Structure of a part of a granulator is shown in FIG. 1. and FIG. 2. The granulator, among other things, includes a gearbox 1, an adapting disc 2, an adapter 3, and a pellet chamber 4. A first direction D1 from the gearbox 1 to the pellet chamber 4 is defined as a front direction, and an opposite, second direction D2 from the pellet chamber 4 to the gearbox 1 is defined as a rear direction. A connecting device of the granulator includes the adapting disc 2 and the adapter 3, and the connecting device is used for connecting the pellet chamber 4 with the gearbox 1.

The gearbox 1 has four side walls 12, 14, 16, 18, a top ceiling 17, and a bottom floor 19. The four side walls are a front side wall 12, a rear side wall 14, a left side wall 16, and a right side wall 18. A power output hole 11 is opened through the front side wall 12 of the gearbox 1. The granulator provides a driving force for a ring die of the granulator through the power output hole 11. In certain embodiments, the power output hole 11 may have a slightly greater diameter in the front portion, and a slightly smaller diameter or diameters in the rear portion. In other embodiments, the diameter of the power output hole 11 may be the same all through the power output hole 11 along the D1-D2 direction. Multiple bolt holes 13 are disposed on the front wall 12 of the gearbox 1 around the power output hole 11 and multiple outer bolt holes 15 are disposed outside the bolt holes 13. In certain embodiment, the bolt holes 13 are disposed on an inner circle, and the outer bolt holes 15 are disposed on an outer circle. The diameter of the inner circle is greater than the diameter of the power output hole 11, and the diameter of the outer circle is greater than the diameter of the inner circle. In certain embodiment, the power output hole 11, the inner circle, and the outer circle are concentric circles. In certain embodiments, the bolt holes 13 and the outer bolt holes 15 are threaded.

The adapting disc 2 is disposed in the front of the gearbox 1. In certain embodiments, the adapting disc 2 is in a shape of a disc. The adapting disc 2 has a front side 22 facing the D1 direction, and a rear side 24 facing D2 direction, i.e., facing the front side wall 12 of the gearbox 1. The adapting disc 2 is fixedly connected to the front side wall 12 of the gearbox 1. Specifically, the outer surface of the rear side 24 of the adapting disc 2 is adhered to the outer surface of the front side wall 12 of the gearbox 1. The adapting disc 2 is opened in the middle with a through hole 21 along the D1-D2 direction. The gearbox 1 outputs power through the through hole 21. In certain embodiments, the diameter of the through hole 21 of the adapting disc 2 is substantially the same as the diameter of the power output hole 11 of the gearbox 1, or substantially the same as the diameter of the front portion of the power output hole 11 of the gearbox 1. In other embodiments, the diameter of the through hole 21 of the adapting disc 2 is slightly greater than the diameter of the power output hole 11 of the gearbox 1, or slightly greater than the diameter of the front portion of the power output hole 11 of the gearbox 1. Multiple second bolt through holes 23 are disposed on the adapting disc 2 around the through hole 21 and multiple outer through holes 25 are disposed outside the second bolt through holes 23. In certain embodiment, the second bolt through holes 23 are disposed on an inner circle, and the outer bolt through holes 25 are disposed on an outer circle. The diameter of the inner circle having the second bolt through holes 23 is greater than the diameter of the through hole 21, and the diameter of the outer circle having the outer bolt through holes 25 is greater than the diameter of the inner circle having the second bolt through holes 23. In certain embodiment, the through hole 21, the inner circle having the second bolt through holes 23, and the outer circle having the outer through holes 25 are concentric circles.

The adapter 3 is in an annular shape. The adapter 3 has a through hole 31, and includes a base 32 and a boss 34 protruding from the base 32 along the D2 direction. The base 32 and the boss 34 are both in an annular shape. The outer diameter of the base 32 is greater than the outer diameter of the boss 34. In certain embodiments, the inner diameter of the boss 34 is slightly smaller than the inner diameter of the base 32. In other embodiments, the inner diameter of the boss 34 may be substantially the same as the inner diameter of the base 32. The outer diameter of the boss 34 is slightly smaller than the inner diameter of the through hole 21 of the adapting disc 2 and the diameter of the power output hole 11 of the gearbox 1, and the outer diameter of the base 32 is greater than the diameter of the through hole 21. During assembly, the boss 34 is inserted into the through hole 21 of the adapting disc 2, and further inserted into the power output hole 11 of the gearbox 1, so that the boss 34 engages with the inner side of the through hole 21 and the inner side of the power output hole 11 at the same time. Multiple first bolt through holes 33 are disposed on the base 32 around the through hole 31. In certain embodiment, the first bolt through holes 33 are disposed on a circle. The diameter of the circle having the first bolt through holes 33 is smaller than the outer diameter of the base 32, and greater than the outer diameter of the boss 34 or the diameter of the through hole 31. In certain embodiment, the through hole 31, the circle having the first bolt through holes 33 are concentric.

The first bolt through holes 33 are disposed on the base 32 of the adapter 3, the second bolt through holes 23 are disposed on the adapting disc 2, the bolt holes 13 are disposed on the front side wall 12 of the gearbox 1. In certain embodiments, the first bolt through holes 33 are uniformly distributed around the through hole 31, the second bolt through holes 23 are uniformly distributed around the through hole 21, and the bolt holes 13 are uniformly distributed around the power output hole 11. The locations of the first bolt through holes 33, the second bolt through holes 23 and the bolt holes 13 are correspondingly aligned with each other. During assembly, after the boss 34 of the adapter 3 is plugged in the through hole 21 of the adapting disc 2 and the power output hole 11 of the gearbox 1, one bolt is inserted into one of the first bolt through hole 33, a corresponding one of the second bolt through hole 23, and a corresponding one of the bolt holes 13, and multiple bolts are applied this way to fix the adapter 3 and the adapting disc 2 to the front side wall 12 of the gearbox 1. Accordingly, the adapting disc 2 is laminated on the front side wall of the gearbox 1. In certain embodiments, the bolts are inserted to the bolt holes 13 of the gearbox 1 by thread connection. The rear side surface of the rear side 24 of the adapting disc 2 is adhered to the outer surface of the front side wall 12 of the gearbox 1, and the adhering area between the rear side 24 and the front side wall 12 is large. Therefore the gravity of the pellet chamber 4 that the adapting disc 2 subject to and the stress on the gearbox 1 from adapting disc 2 can be uniformly distributed on the front side wall 12 of the gearbox 1, so that the gearbox 1 is prevented from being damaged and broken due to concentrated force.

The multiple outer bolt through holes 25 are disposed outside the second bolt through holes 23, and the outer bolt holes 15 are disposed outside the bolt holes 13. The locations of the outer bolt through holes 25 correspond to the locations of the outer bolt holes 15. Bolts may be applied to the outer bolt through holes 25 and connected to the outer bolt holes 15, so that the connection between the adapting disc 2 and the gearbox 1 is further stabilized.

In certain embodiments, the left side and the right side of the adapting disc 2 are symmetrically equipped with installing table facets 26. One of the two installing table facets 26 of the adapting disc 2 is connected with the pellet chamber 1 through a hinge, while the other installing table facet 26 is connected with the pellet chamber 1 through a clamp. As shown in FIG. 3, the installing table facet 26 on one side of the adapting disc 2 is installed with a hinge 5, the installing table facet 26 on the other side is installed with a clamp 6. One side of the pellet chamber 4 is connected with the hinge 5, while the other side of the pellet chamber 4 is connected with the clamp 6. The position of the hinge 5 and the clamp 6 are interchangeable.

In certain embodiments, the adapting disc 2 may be a spheroidal-graphite cast iron adapting disc or a steel adapting disc.

In summary, certain embodiments of the present invention, among other things, have the following advantages. The pellet chamber 4 and the gearbox 1 are connected by means of the adapter 3 and the adapting disc 2, so that the whole front side wall 12 of the gray cast iron gearbox 1 are used to bear stress. Therefore the force which the gearbox 1 suffers is more reasonable distributed, and the overloaded gearbox 1 would not be broken due to impact. Further, the installing table facets 26 symmetrically arranged on the left side and the right side of the adapting disc 2, and allow installing the pellet chamber 4 from the left-hand side or right-hand side through a hinge. Thus, the opening direction of the pellet chamber 4 can be chose optionally from either the left-hand side or the right-hand side. Furthermore, the pellet chamber 4 with different sizes can be adaptively installed, so that the standardization and universalization of the parts can be realized.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A connecting device for connecting a pellet chamber to a gearbox having a front side wall having multiple inner bolt holes disposed on the front side wall around a power output hole and multiple outer bolt holes disposed on the front side wall outside the inner bolt holes, comprising:

an adapting disc, having a disc body having a front side fixedly connected to the pellet chamber, and a rear side fixedly connected to the front side wall of the gearbox, and a through hole disposed at a middle part of the adapting disc, wherein the adapting disc has multiple inner through holes disposed on the disc body around the through hole, and multiple outer through holes disposed on the disc body outside the inner through holes, wherein locations of the inner through holes of the adapting disc and the inner bolt holes of the front side wall of the gearbox are correspondingly aligned with each other, and locations of the outer through holes of the adapting disc and the outer bolt holes of the front side wall of the gearbox are correspondingly aligned with each other, and wherein the rear side of the disc body of the adapting disc is fixedly connected to the front side wall of the gearbox by bolts passing through the outer through holes of the adapting disc and the corresponding outer bolt holes of the front side wall of the gearbox; and an annular adapter, having a base, a boss protruding from the base, and multiple bolt through holes disposed on the base around the bass, wherein locations of the bolt through holes of the annular adapter, the inner through holes of the adapting disc and the inner bolt holes of the front side wall of the gearbox are correspondingly aligned with each other, wherein the annular adapter is fixedly connected to the front side wall of the gearbox by bolts passing through the bolt through holes of the annular adapter, the inner through holes of the adapting disc and the inner bolt holes of the front side wall of the gearbox so that the adapting disc is located between the base of the annular adapter and the front side wall of the gearbox, wherein a power of the gearbox is outputted from the through hole of the adapting disc.

2. The connecting device of claim 1, wherein the adapting disc is in a shape of a disc, and a rear surface of the rear side of the adapting disc is adhered to a front surface of the front side wall of the gearbox.

3. The connecting device of claim 1, wherein a left side and a right side of the adapting disc are symmetrically equipped with installing table facets, for installing hinges and/or clamps of the pellet chamber.

4. The connecting device of claim 3, wherein a number of the installing table facets is two, one of the two installing table facets of the adapting disc is connected with the pellet chamber through the hinge, and the other one of the two installing table facets is connected with the pellet chamber through the clamp.

5. The connecting device of claim 1, wherein the power output hole of the gearbox is disposed through a center of the front side wall of the gearbox, and wherein the boss of the annular adapter is configured to be inserted into the through hole of the adapting disc and the power output hole of the gearbox, and to engage with the through hole of the adapting disc and the power output hole of the gearbox at the same time.

6. The connecting device of claim 1, wherein the adapting disc is a spheroidal-graphite cast iron adapting disc or a steel adapting disc.

7. The connecting device of claim 1, wherein the multiple inner bolt holes of the front side wall of gearbox are disposed on the front side wall in an inner circle around the power output hole, and the multiple outer bolt holes of the front side wall of gearbox are disposed on the front side wall in an outer circle that is outside the inner bolt holes so that a diameter of the outer circle is greater than that of the inner circle.

8. The connecting device of claim 7, wherein the multiple inner bolt holes of the adapting disc are disposed on the disc body in an inner circle around the through hole, and the multiple outer bolt holes of the adapting disc are disposed on the disc body in an outer circle that is outside the inner bolt holes so that a diameter of the outer circle is greater than that of the inner circle.

9. The connecting device of claim 1, wherein an outer diameter of the base of the annular adapter is greater than an outer diameter of the boss of the annular adapter.

* * * * *